(No Model.) 2 Sheets—Sheet 1.
J. E. WOLF.
DRAFT ATTACHMENT.
No. 545,997. Patented Sept. 10, 1895.
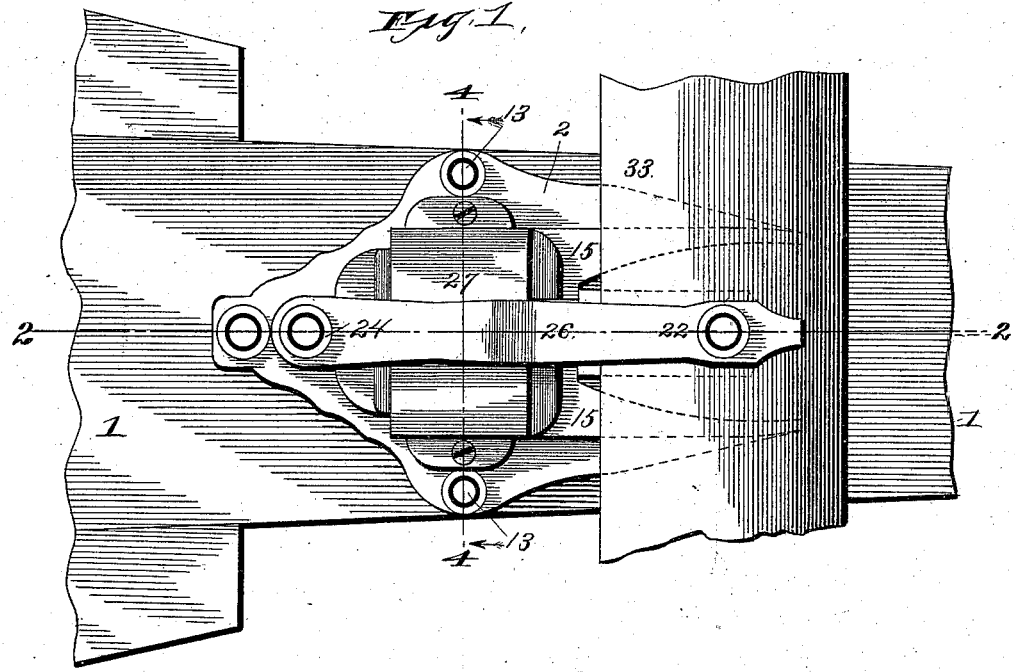
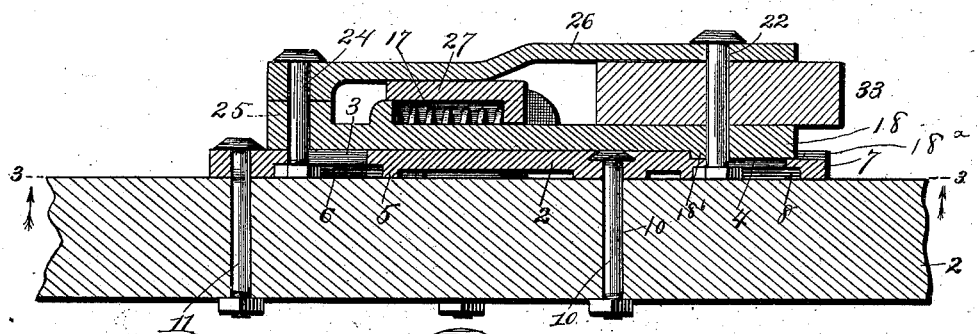
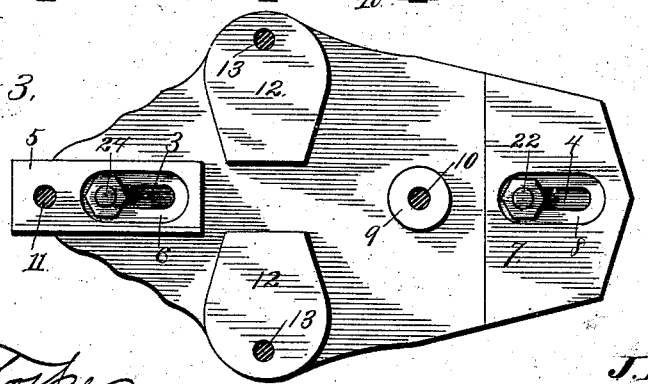
Witnesses:
Inventor:
J. E. Wolf,
By, Higdon & Higdon
Atty's.

(No Model.)   J. E. WOLF.   2 Sheets—Sheet 2.
DRAFT ATTACHMENT.
No. 545,997.   Patented Sept. 10, 1895.
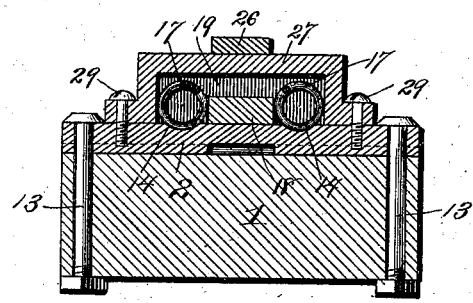
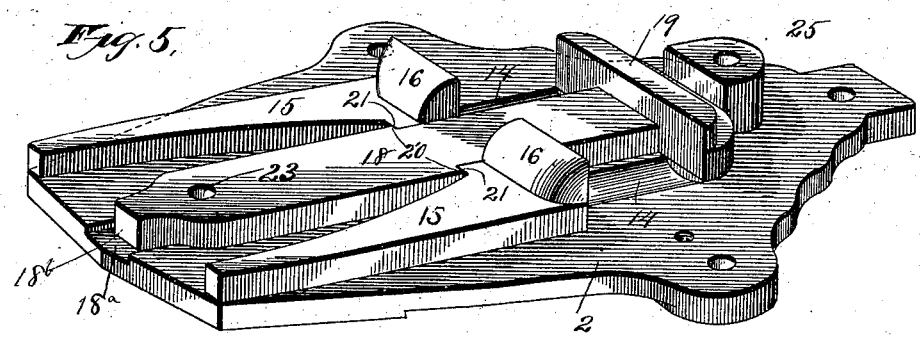
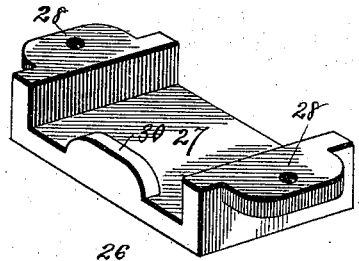
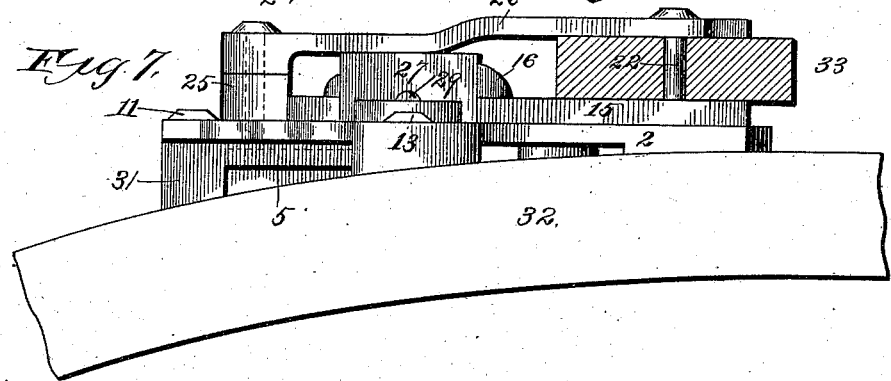
Witnesses:   Inventor:
J. E. Wolf,
By Higdon & Higdon
Attys.

UNITED STATES PATENT OFFICE.

JONATHAN E. WOLF, OF WELDA, KANSAS.

DRAFT ATTACHMENT.

SPECIFICATION forming part of Letters Patent No. 545,997, dated September 10, 1895.

Application filed November 5, 1894. Serial No. 527,941. (No model.)

*To all whom it may concern:*

Be it known that I, JONATHAN E. WOLF, of Welda, Anderson county, Kansas, have invented certain new and useful Improvements in Draft Attachments, of which the following is a full, clear, and exact description, reference being had to the accompanying drawings, forming a part hereof.

My invention relates to draft attachments for various types of vehicles which are propelled by animal power—such as buggies, carriages of all kinds, trucks and wagons for heavy hauling, harvesters, thrashing-machines, and all other kinds of wheeled vehicles and machines which are designed to be drawn or propelled by draft-animals.

The objects of my invention are to produce a draft attachment which shall be simple, strong, durable, and inexpensive in construction, and which shall relieve the shoulders of the animals, as well as the hames, collars, breast-straps, and similar parts of the harness from the strains incident to starting and hauling heavily-loaded or other vehicles.

To the above purposes my invention consists in certain peculiar and novel features of construction and arrangement, as hereinafter described, and pointed out in the appended claims.

In order that my invention may be fully understood, I will proceed to describe it with reference to the accompanying drawings, in which—

Figure 1 is a plan view of my improved draft attachment. Fig. 2 is a vertical longitudinal section of the same on the line 2 2 of Fig. 1. Fig. 3 is an under side plan view of the base-plate of the attachment. Fig. 4 is a transverse vertical section of the same on the line 4 4 of Fig. 1. Fig. 5 is a perspective view of the base-plate and the immediate upper connections of the attachment, the boxing and yoke-bar being removed. Fig. 6 is a detached inverted perspective view of the boxing-piece of the attachment. Fig. 7 is a view, principally in side elevation and partly in vertical longitudinal section, of a slightly-modified form of the draft attachment, said form adapting the attachment for application to a pole or tongue having a downwardly-curved rear end.

Referring first to the construction shown in Figs. 1 to 6 of the drawings, inclusive, 1 designates the tongue or pole of a carriage, wagon, or a harvester, thrashing-machine, or any other type of vehicle which is designed to be drawn or propelled by draft-animals or by a single draft-animal, the draft attachment being equally applicable to the cross-bar of a single pair of shafts or thills.

2 designates the base-plate of my improved attachment, which is of elongated form. Viewed in plan it is widest near its middle and converges toward each end, more abruptly toward its rear end, preferably, to make it as light as possible consistent with strength. It is to be understood, however, that this precise marginal contour of the base-plate 2 is not absolutely essential to the spirit of my invention, and that said base-plate may be of any other suitable or preferred marginal contour, as desired. At its rear end the plate 2 is formed with a longitudinal slot 3, and at its front end with a similar longitudinal slot 4. The object of said slots will be hereinafter explained. At the rear end of its under side the base-plate 2 is formed with a downwardly-extending enlargement or offset 5, in which is formed a countersunk opening 6, which registers with the slot 3, and at its front end, on the under side thereof, the base-plate 2 is formed with a downwardly-extending enlargement or offset 7, in which is formed a countersunk opening 8, which registers with the slot 4. Midway of its length the plate 2 is formed on its under side with a boss or enlargement 9, through which extends a bolt 10, said bolt also extending through the plate 2 and downwardly through the tongue 1 or through the cross-bar of the vehicle. At the rear end of the base-plate 2 is formed an opening through which extends downwardly a suitable bolt 11, said bolt also passing downward through the tongue or cross-bar of the vehicle, and this further secures the base-plate to said parts. On the under side of base-plate 2, at opposite sides and about midway of the length thereof, are formed two enlargements or offsets 12, through which extend downwardly two bolts 13, said bolts also extending downwardly through the tongue or cross-bar and thus still further assisting to secure the base-plate to the said tongue or cross-bar. Upon the upper side of the base-plate 2 are formed two elongated recesses or sockets 14, each of which is of segmental form in cross-section and which extend parallel with each other between the points occupied (on the under side of the base-plate) by the enlargements or offsets 12. Upon the upper side of the base-plate 2 are also formed two enlongated enlargements 15, which extend longitudinally of the base-plate and which, at their inner sides, preferably curve forward on slightly diverging lines, as shown. The rear ends of these elongated enlargements terminate at the front ends of the sockets or recesses 14, and said rear ends are formed with upwardly-extending projections 16. The sockets 14 are designed to receive two spiral springs 17, the front ends of which abut against the rear sides of the enlargements 16.

18 designates an elongated slide-bar which extends longitudinally of the base 2 on the upper side thereof, and which at its rear end is formed with a cross-head 19, and at a point about midway of its length with a pair of oppositely-disposed shoulders 20, which engage at times with two inwardly-extending shoulders 21 on the rear parts of the enlargements 15. At its front end the sliding bar is provided with a depending guide-rib 18ª, engaging a longitudinal groove or channel 18ᵇ in the base-plate to insure direct longitudinal movement. A bolt 22 extends through an opening 23 in the front end of the slide-bar 18, and said bolt also extends downwardly through the slot 4 and countersunk opening 8 described, while a second bolt 24 extends through an enlargement 25 on the rear end of the slide-bar 18 and also through the slot 3 and countersunk opening 6 in the rear end of the base-plate 2. Said countersunk openings receive the nuts engaging the lower ends of the bolts 22 and 24. An elongated yoke-bar 26 connects the bolts 22 and 24, and a box-piece 27, which is U-shaped in cross-section, overlies the slide-bar 18 and the springs 17, and is provided at its ends with flanges 28, through which extend screws 29, which also enter the base-plate 2 and thus secure the boxing-piece of the base 2. A downwardly-extending flange or lug 30 on the under side of the boxing-piece 27, at the front margin thereof, also assists in limiting the forward movement of the slide-bar 18 by contact with the cross-head 19.

The structure shown in Fig. 7 is precisely similar to that shown in the preceding figures of the drawings, excepting that on the under side of its rear end it is formed with a downwardly-extending leg or standard 31 to support the base-plate 2 in horizontal position when the draft attachment is secured to a tongue 32, having a downwardly-extending rear end, as shown.

From the above description it will be seen that the doubletree 33 or the singletree is pivoted upon the bolt 22, and that as the animals pull upon the traces the cross-head 19 compresses the springs and thus relieves the animals' shoulders and the harness of the violent strains which would otherwise be produced.

The device is simple, durable, strong, and inexpensive in construction, and is adapted for application to all of the various types of vehicles before specified.

Having thus described my invention, what I claim as new therein, and desire to secure by Letters Patent, is—

1. A draft attachment, comprising a base-plate attachable to a tongue or cross-bar of a vehicle, having a pair of perforations arranged on the same longitudinal line, and a groove or channel at its front end, and also in the longitudinal line of said perforations, a pair of elongated enlargements at the upper side of the plate at opposite sides of said groove or channel, provided with forwardly-disposed shoulders, a sliding bar upon the said base-plate between the enlargements thereof, and provided with a cross-head at its rear end and a rib at its front end depending within the groove or channel of the said base-plate, a pair of buffer-springs interposed between the said cross-head and the said enlargements of the base-plate, and bolts extending through the perforations of the base-plate, registering perforations of the sliding bar and the double or single-tree of the vehicle, substantially as set forth.

2. A draft attachment comprising a base-plate attachable to a tongue or cross-bar of a vehicle, having a pair of perforations arranged on the same longitudinal line, and a groove or channel at its front end, and also in the longitudinal line of said perforations, a pair of elongated enlargements at the upper side of the plate at opposite sides of said groove or channel, provided with forwardly-disposed shoulders, a sliding bar upon the said base-plate between the enlargements thereof, and provided with a cross-head at its rear end and a rib at its front end depending within the groove or channel of the said base-plate, a pair of buffer-springs interposed between the said cross-head and the said enlargements of the base-plate, bolts extending through the perforations of the base-plate, registering perforations of the sliding bar and the double or single-tree of the vehicle, and a boxing overlying the base-plate, the springs and the sliding bar, and provided with a flange at its front end which depends into the path of the cross-head of the sliding bar, substantially as set forth.

In testimony whereof I affix my signature in the presence of two witnesses.

JONATHAN E. WOLF.

Witnesses:
  G. Y. THORPE,
  S. B. FALOR.